United States Patent

[11] 3,586,294

[72] Inventor James J. Strong
 22 Diaz Avenue, San Francisco, Calif. 94132
[21] Appl. No. 801,086
[22] Filed Feb. 20, 1969
[45] Patented June 22, 1971

[54] METHOD AND APPARATUS FOR CREATING A SUSPENSION OF FINE PARTICLES IN A LIQUID
9 Claims, 4 Drawing Figs.
[52] U.S. Cl. .................................................. 259/18
[51] Int. Cl. .................................................. B01f 5/00
[50] Field of Search .......................................... 259/4, 18, 36, 60, 95, 1, 2

[56] References Cited
UNITED STATES PATENTS
| | | | |
|---|---|---|---|
| 895,795 | 8/1908 | Sampson | 259/4 |
| 1,196,595 | 8/1916 | Sharpe | 23/70 |
| 1,737,699 | 12/1929 | Bond | 259/4 |
| 2,322,087 | 6/1943 | Atwood | 259/18 |
| 2,603,460 | 7/1952 | Kalinske | 259/4 |

Primary Examiner—Robert W. Jenkins
Attorney—Alfons Puishes

ABSTRACT: A novel arrangement of fluid nozzles or spargers is positioned in a critical manner above a bed of sludge in the bottom of a settling tank or phase separator, such as that employed in a powdered ion exchange process of water treatment. Operation of the spargers causes a complete 100 percent suspension of the fine particles comprising the sludge thereby making complete removal of the particles by pumping out the suspension possible without the use of any mechanical agitators. Especially adapted in connection with nuclear processes where radioactivity of the sludge creates a problem, not only of suspension but also the necessity for complete 100 percent removal.

INVENTOR.
James J. Strong
BY
Attorney

METHOD AND APPARATUS FOR CREATING A SUSPENSION OF FINE PARTICLES IN A LIQUID

BACKGROUND OF THE INVENTION

The need for completely demineralized water in many processes has existed for some time. This in modern processes is usually accomplished by the use of special resins containing a combination of anion and/or cation components in the form of a fixed bed of substantial depth. Removal of the spent resin and its regeneration or disposal has been accomplished in many various manners.

The requirements of the atomic energy industry, and particularly those in connection with the operation of nuclear reactors, introduces a particular problem in that the resin becomes radioactive and creates particular difficulties in connection with its handling, which in turn is further aggravated by the necessity for extreme cleanliness in the system, as is well known to those skilled in the art. In recent years special resins have been developed for such applications, a typical resin being "Powdex," a product of the Graver Water Conditioning Company. This, like other similar resins, is comprised of particles having a size range of 90 percent through a 325 mesh screen.

One of the first steps in disposing of the spent resin is to pump it as a water slurry to a settling tank, or a phase separator. Here the resin is allowed to settle to the bottom of the tank and periodically the clear liquid is drawn off the upper portion or decanted. The resin is permitted to accumulate in the bottom of the tank for a prolonged period permitting radioactive decay to take place. The spent resin, or sludge, thus accumulated takes on the consistency of compacted silt. This, of course, must be removed periodically and sent to a centrifuge or other process.

To properly effect the removal of the sludge it is necessary to again put it in suspension in a liquid and then pump it out of the tank or phase separator. Mechanical agitators, such as propeller mixers, are distinctly disadvantageous for this application and in the case of nuclear applications they are not permitted because of the impossibility of access for maintenance. The necessity for complete and thorough suspension is very important, in fact, it is critical in the case of nuclear applications since it is necessary to effect a complete removal of the sludge to insure cleanliness and prevent contamination and radioactive hazard. This suspension must actually comprise a homogeneous mixture which must be maintained during the entire period of the pumpout of the tank.

While the use of fluid nozzles or spargers has been known for some time in connection with agitation operations in chemical processes, as heretofore known these resulted in a rather haphazard mixture of the particles in the liquid and did not insure the complete suspension as required in connection with the operations described herein.

SUMMARY

I have discovered that by utilizing fluid operated nozzles or spargers and positioning them in a critical position with respect to the bed of sludge and arranging them at critical angles with respect to one another and also with respect to the phase separator or vessel. I am able to achieve the thorough suspension or homogeneous mixture required in a relatively short space of time and to maintain it properly until the mixture is completely pumped from the tank, permitting no residue to remain in isolated areas, as is the case in present methods where mechanical mixers are not used. The recirculation through the spargers or eductors during the pumpout operation also serves to rinse the bottom of the tank.

Essentially my invention utilizes a conventional cylindrical tank which comprises the settling basin or phase separator. The spent resin is pumped into this vessel in a slurry from where it is allowed to settle and the clear liquid decanted as in previous methods. The resin accumulates in the form of a sludge in the bottom as heretofore described, until it is time for removal. In order to effect the difficult operation of resuspending the siltlike accumulation of sludge, I utilize the special sparger arrangement and location of my invention. The latter comprises a horizontal header positioned diametrically across the interior of the tank and connected to a series of laterals at right angles to it. On each of the laterals I position one or more sparger nozzles which may be of the eductor type. These I position in such a manner that one set of spargers is directed so that the nozzle or jet issuing therefrom would be tangent to an imaginary circle in the interior of the vessel. A second set of spargers I position so their corresponding jets or nozzles would be tangent to another imaginary circle of smaller diameter than the first and concentric with it. The general direction of the jets from the second set of spargers is opposite to that of the first set. The effect of this is to cause a rotary motion or vortex in the liquid in the outer portion of the tank, rotating in one direction, and a second vortex of smaller diameter closer to the center of the tank rotating in the opposite direction. Where these two vortexes meet I obtain a very high and intense area of turbulence which may be varied to suit different conditions. Secondary areas of intense turbulence are created by the suction and discharge effects of the spargers themselves.

The spargers or mixing eductors which I utilize maintain a uniform mixture of slurry recirculation through the eductors themselves with partial flow diverted to slurry discharge.

To realize this unusual effect and have it work on the sludge bed properly I locate my sparger nozzles close to the interface between the liquid and solid phases and direct them at a critical angle, depending upon the height of the sludge level in the tank. I also position them so that the discharge of each sparger feeds into the suction of the succeeding one. This is all set forth in the detailed description which follows.

DESCRIPTION OF A PREFERRED EMBODIMENT

Figure 1:
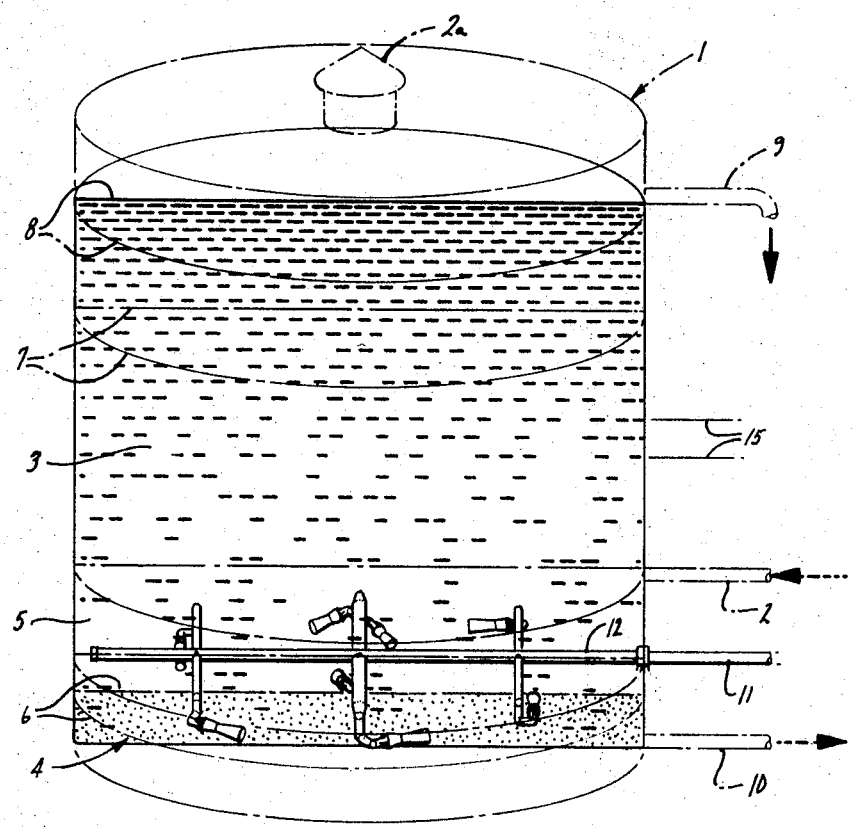
FIG. 1 is a phantom isometric view showing a typical tank and sparger arrangement of my invention.
Figure 2:
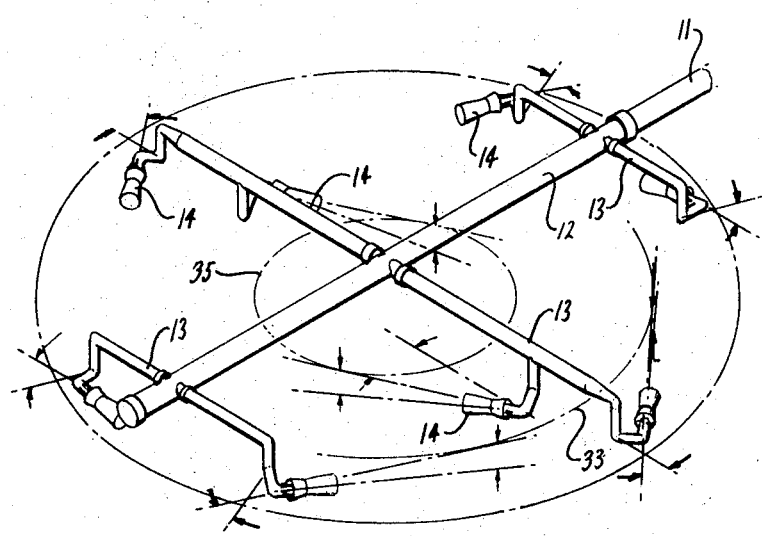
FIG. 2 is an isometric showing the relative position of header, laterals, and spargers.

Referring now to the drawings and first particularly to FIG. 1 and FIG. 2, there is seen a cylindrical tank 1 equipped with inlet connection 2 and vent 2a. A settling zone is seen at 3 in which the particles are seen descending to the bottom of the vessel to form the settled sludge 4. A buffer zone 5 is located between settling zone 3 and sludge 4. The interface 6 is shown between settled sludge 4 and buffer zone 5. A liquid level known as the batch level is seen at 7 and the maximum liquid level is at 8. Overflow 9 is connected to tank 1 at or near the maximum water level 8.

Figure 2A:
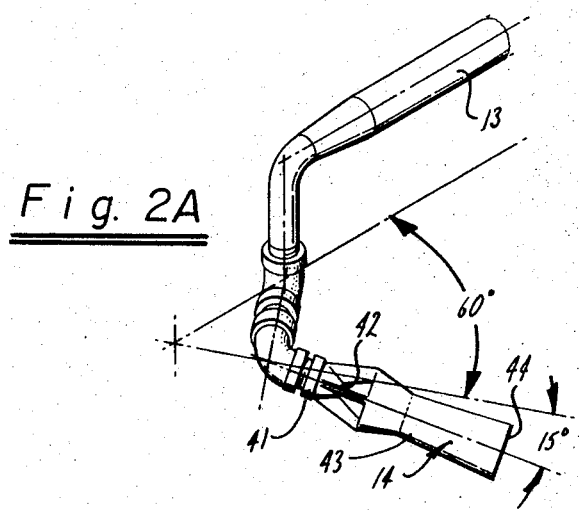
FIG. 2a shows a single sparger connected to a lateral indicating the critical angle ranges and sparger parts.

Outlet connection 10 on tank 1 leads to the pump suction. Sparger inlet connection 11 leads to sparger main header 12 which in turn connects with laterals 13. Spargers 14 are connected to their respective laterals 13, which may be seen more particularly on FIG. 2. The angular position of the spargers with relation to the other elements are very important, both in a horizontal plane as shown, and also in a vertical plane. This combines to produce the unusual effect described diagrammatically on FIG. 3. While these angles will vary somewhat with the diameter of the tank and depth of the particle bed, I have found that for most applications a horizontal angle to the radial line to each sparger with the range of 45° to 90° will work, becoming critical at approximately 60° for the outer spargers. The corresponding angles for the inner spargers is 10° to 30° becoming critical at approximately 15°. For the vertical angle I have discovered that a range of 10° to 30° to the horizontal and directed towards the interface will work and will become critical at approximately 15° . This is shown in FIG. 2a. The sparger main header 12 is seen to be located so that the spargers themselves would be close to the interface 6 which is also shown in more detail on FIG. 2a as well as FIG. 1. Decant lines 15 are connected to tank 1 at convenient locations depending on individual requirements to permit decanting of the clear liquid back through the process after settlement of the particles has taken place.

Figure 3:
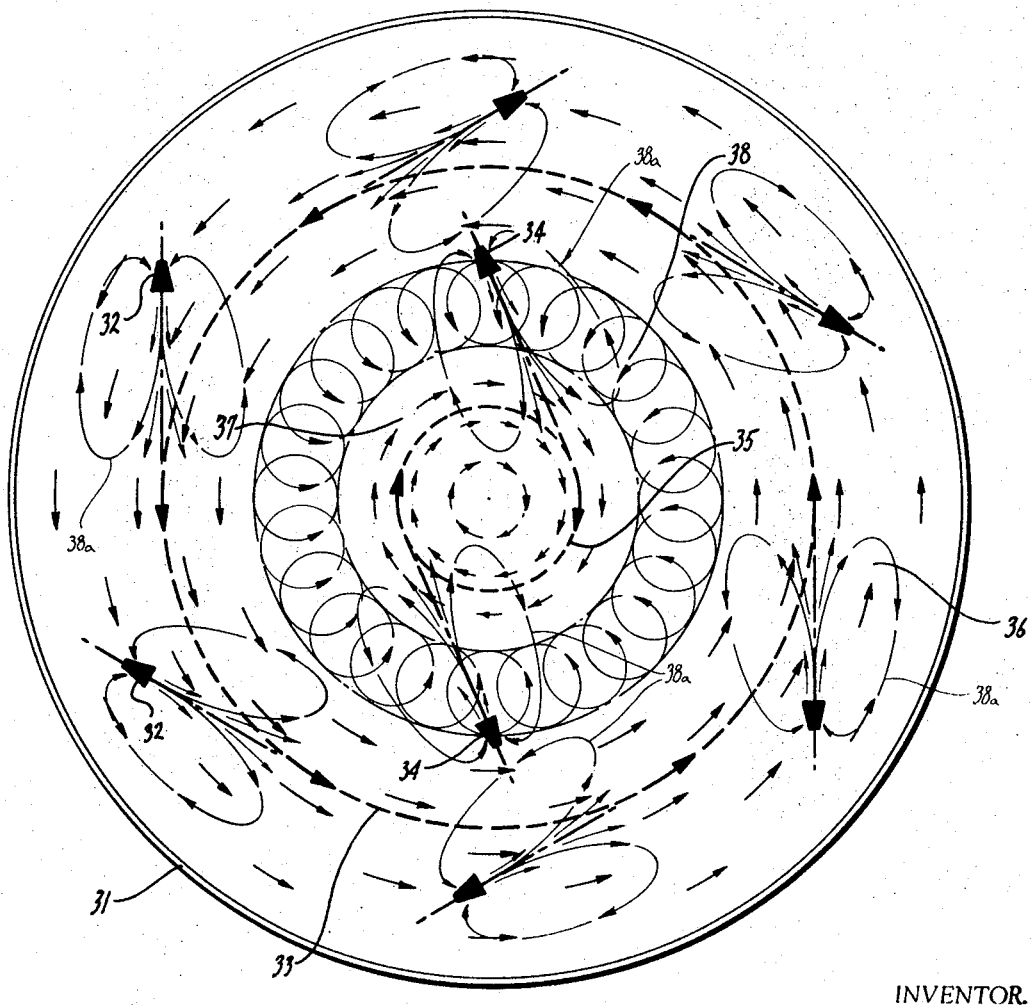
FIG. 3 is a schematic diagram showing the unusual effects produced by the sparger arrangement.

Referring now to FIG. 3, there is shown diagrammatically what is believed to be the phenomenon which produces the unusual effect of my invention. The arrangement disclosed herein was arrived at only by long and laborious experimentation and while what actually takes place is not capable of accurate, rational analyses, the results observed are critical and very definite and conclusive. FIG. 3 is offered and included mainly for a better understanding of my invention.

The cross section of the tank or vessel shell, which, of course, is circular, is seen at 31. The outer ring of spargers is seen at 32. The angular position in a horizontal plane of the spargers 14, as shown in FIG. 2, cause their jets to impinge upon an imaginary outer circle of tangency 33. Inner spargers 34 in turn have their jets impinge tangentially upon an imaginary inner circle of tangency 35.

The action of the outer spargers 32 causes the liquid in the tank to travel circumferentially in the nature of a vortex 36, as indicated by the plurality of arrows, and in the example shown in a counterclockwise direction. The inner spargers 34, on the other hand, cause the fluid in the tank which is close to them to travel clockwise in a circular or what approximates a vortex path. This is likewise indicated by the plurality of arrows shown at 37. Since this phenomenon originates close to the interface and continues down through the mass of particles, it causes the particles to rise in suspension. The two masses of fluid appear to further have an unusual effect upon one another, not only where they may be considered to join but where they overlap throughout a substantial area of the cross section. This seems to have the result of producing a high-turbulence zone which may account for the unusual suspension effect that is produced upon the particles. This high turbulence zone 38 is not necessarily sharply defined apparently, but may be varied in extent, not only by the angular position of the spargers, but also by the amount of fluid which is caused to flow through them as described more fully below. Secondary turbulence zones 38a are created at each sparger by the combined effect of their suctions and discharges.

Referring now again to FIG. 2a, there is seen a typical sparger which may be used with my invention. It comprises an inlet connection 41, suction ports 42, body 43, and outlet nozzle 44. The actual operation of this element of my invention is set forth in greater detail below.

OPERATION

A brief description of the operation of my invention in a typical application will now be given.

Fine Particles: Powdex resin
   Trade Name___ Graver powdex resin.[1]
   Type_____ Anion—hydroxide (PAO).
                         Cation—hydrogen (PCH-5).
   Ratio_____ Cation anion = 2:1.
   Particle size___ 40–50 microns.

[1] Graver Water Conditioning Company.

The resin contains approximately 10 percent iron oxide (by weight) of 0.2 to 5.0 microns particle size.

OPERATING CONDITIONS

The phase separator functions with an identical separator. One separator receives sludge as the other stands, allowing for the radioactive decay period. Since one of the separators continually emits radiation, the separators are normally inaccessible for maintenance. Basic separator tank functions are as follows:

When the Powder resin in a demineralizer unit is depleted, it is flushed into the phase separator where it settles for a specified period. The free water is then pumped out through the decant pipes shown.

This cycle repeats several times over a one to two month period until a maximum amount of Powder resin sludge has collected at the bottom of the tank.

The settled sludge is allowed to stand for a period of radioactive decay (one to two months).

The condensate water, introduced through a mixer, fluidizes and dilutes the sludge to a 5 percent (by weight) slurry which is pumped to a centrifuge as described. Part of the slurry may be recirculated through the mixer to keep the resin in suspension.

MIXING

When accumulated sludge is to be removed my invention will accomplish a complete mixing of the sludge comprising a 5 percent slurry. Water mixing eductors or spargers are located as shown. Mixing eductors may utilize motive fluid of 50 g.p.m. per eductor on the condensate tanks and 25 g.p.m. per eductor on the cleanup tanks, at a minimum differential pressure of 25 p.s.i. across the nozzle. During pumpout the contents will maintain a homogeneous mixture until the tank is empty. Mixing eductors further maintain uniform mixture by slurry recirculation through the mixer with partial flow diverted to slurry discharge (centrifuge) piping.

Of course the quantity of spargers may be varied if desired by increasing or decreasing the pressure drop. This will not basically affect the criticality of the phenomenon on the operation of my invention. Generally a ratio of suction flow into the eductor at inlet 42 to the driving flow at outlet 44 is 3 or 4 to 1. This measurably affects the secondary turbulence 38a and may be modified as desired by adjusting the waterflow and hence pressure drop through the eductors or spargers.

It should now be clear to those skilled in the art how my invention produces the unusual and unexpected results discussed above.

I claim:
1. A method of creating a liquid suspension of a mass of fine particles which have settled out of a liquid in a vessel and formed an interface between said liquid and said mass comprising the steps:
   introducing a plurality of jets of fluid under pressure above said interface and directed towards it;
   said jets being so directed as to create a vortex in said liquid above said interface thereby causing said particles to rise from said mass and be dispersed uniformly through said liquid;
   said jets being further so positioned as to create a uniformly high turbulence in said liquid thereby maintaining said particles in a uniformly dispersed state in said liquid.

2. A method of suspending in a liquid a mass of fine particles collected at the bottom of a vessel comprising the steps:
   introducing a liquid into said vessel to a level substantially above said mass of particles thereby creating an interface between said mass of particles and said liquid;
   directing a first set of fluid jets into said vessel above said interface;
   said first jets being so directed as to be tangent to a first imaginary circle located inside said vessel and concentric therewith;
   directing a second set of fluid jets into said vessel above said interface;
   said second jets being so directed as to be tangent to a second imaginary circle located inside said vessel and concentric therewith and having a diameter substantially less than that of said first imaginary circle;
   said second jets being further positioned in a direction opposite to that of said first jets;
   said first jets and said second jets being further directed towards said interface at a predetermined angle to the horizontal.

3. The method of claim 2 including the steps of varying the intensity of said first jets and said second jets independently.

4. An apparatus for creating a liquid suspension of a mass of fine particles which have settled to the bottom of a vessel comprising:
   means for introducing a liquid into said vessel and creating an interface between said mass of particles and said liquid;

a manifold comprising a pipe header and a plurality of laterals connected to said header positioned horizontally above said interface;

a first set of nozzles connecting to said laterals and forming a generally circular configuration within said vessel;

said first nozzles being directed so as to be tangent to a first imaginary circle located inside said vessel and concentric therewith;

said first nozzles being further directed in the same rotative direction with respect to the central axis of said vessel;

a second set of nozzles connecting to said laterals and forming a generally circular configuration within said vessel;

said second nozzles being directed so as to be tangent to a second imaginary circle inside said vessel and concentric therewith and having a diameter substantially less than that of said first imaginary circle;

said second nozzles being further directed in the same rotative direction with respect to the central axis of said vessel but in a rotative direction opposite to that of said first nozzles;

said first nozzles and said second nozzles being further directed towards said interface at a predetermined angle to the horizontal;

means for introducing a fluid under pressure to said manifold and thence through said nozzles.

5. The apparatus of claim 4 in which each of said first nozzles is so directed as to form an angle with a radial line to said nozzle of approximately 60°.

6. The apparatus of claim 4 in which each of said second nozzles is so directed as to form an angle with a radial line to said nozzle of approximately 15°.

7. The apparatus of claim 4 in which said predetermined angle to the horizontal of said first nozzles and said second nozzles is approximately 15°.

8. The apparatus of claim 4 including means for independently varying the pressure of said fluid to said nozzles.

9. The apparatus of claim 4 in which said nozzles are of fluid eductor type having an inlet at one end, suction parts communicating therewith and a discharge at the opposite end.